United States Patent [19]

Spatafora

[11] Patent Number: 5,400,574
[45] Date of Patent: Mar. 28, 1995

[54] SYSTEM FOR FEEDING AND PACKING PRODUCTS IN PILLOW PACK WRAPPINGS

[75] Inventor: Mario Spatafora, Bologna, Italy

[73] Assignee: Azionaria Costruzioni Macchine Automatiche A.C.M.A. S.P.A., Bologna, Italy

[21] Appl. No.: 81,146

[22] Filed: Jun. 25, 1993

[30] Foreign Application Priority Data

Jun. 26, 1992 [IT] Italy ................. BO92A0258

[51] Int. Cl.⁶ ..................... B65G 47/00; B65B 35/30
[52] U.S. Cl. ......................... 53/531; 53/251; 198/377; 198/419.2; 198/476.1
[58] Field of Search ............... 53/251, 250, 544, 531, 53/277; 198/476.1, 474.1, 475.1, 377, 419.2, 419.3

[56] References Cited

U.S. PATENT DOCUMENTS

| | | | |
|---|---|---|---|
| 2,605,946 | 8/1952 | Currivan | 53/251 X |
| 3,513,629 | 5/1970 | Hoagland et al. | 53/531 X |
| 3,858,709 | 1/1975 | Banyas et al. | 198/377 |
| 3,941,233 | 3/1976 | Aiuola et al. | 198/476.1 X |
| 4,645,063 | 2/1987 | Seragnoli | 198/475.1 X |
| 4,790,116 | 12/1988 | Stridh | 53/251 X |

*Primary Examiner*—James F. Coan
*Attorney, Agent, or Firm*—Oblon, Spivak, McClelland, Maier, & Neustadt

[57] ABSTRACT

A system whereby products are fed in orderly succession by a feed conveyor to the input conveyor of a machine for packing the products in pillow pack type wrappings; and whereby the products are transferred between the mutually aligned feed and input conveyors by means of at least one transportation head rotatable about its axis and which is moved by a hypocyclic drive along a substantially quadrilateral path, one side of which is aligned with, and extends along facing end portions of, the two conveyors.

10 Claims, 5 Drawing Sheets

SYSTEM FOR FEEDING AND PACKING PRODUCTS IN PILLOW PACK WRAPPINGS

BACKGROUND OF THE INVENTION

The present invention relates to a system for feeding and packing products in pillow pack wrappings.

The present invention is particularly suitable for packing food products, to which the following description refers purely by way of example.

In the food industry, products such as biscuits, snacks and similar are packed singly or in groups in pillow pack wrappings on systems comprising a pillow pack wrapping machine, and a supply line for feeding the products from the production unit to the wrapping machine.

On known systems of the aforementioned type, the supply line is normally designed according to the type of product for packing and the type of pack required, so that any change in the product and/or pack normally involves also changing the supply line.

SUMMARY OF THE INVENTION

It is an object of the present invention to provide a substantially "universal" system for feeding and packing products in pillow pack wrappings, that is, a system which, with only minor changes, is designed to both accommodate various types of products and produce various types of packs.

According to the present invention, there is provided a system for feeding and packing products in pillow pack wrappings, the system comprising a machine for wrapping the products in pillow pack type wrappings; an input conveyor to said machine; a conveyor for feeding an orderly succession of said products to the input conveyor; and transfer means for transferring the products from the feed conveyor to the input conveyor; characterized by the fact that said transfer means comprise at least one transportation head, and drive means for moving the transportation head along a substantially quadrilateral path, one side of which extends along facing end portions of the two conveyors.

On the above system, the transportation head is preferably located over the two conveyors, which are preferably aligned with each other.

Moreover, the transfer means preferably comprise actuating means selectively operable so as to rotate the transportation head by a given amount about its axis and in relation to the drive.

BRIEF DESCRIPTION OF THE DRAWINGS

A non-limiting embodiment of the present invention will be described with reference to the accompanying drawings, in which:

FIGS. 9 to 12 show views in perspective of different types of packs producible on the FIG. 1 system.

DETAILED DESCRIPTION OF TEE INVENTION

Figure 1:
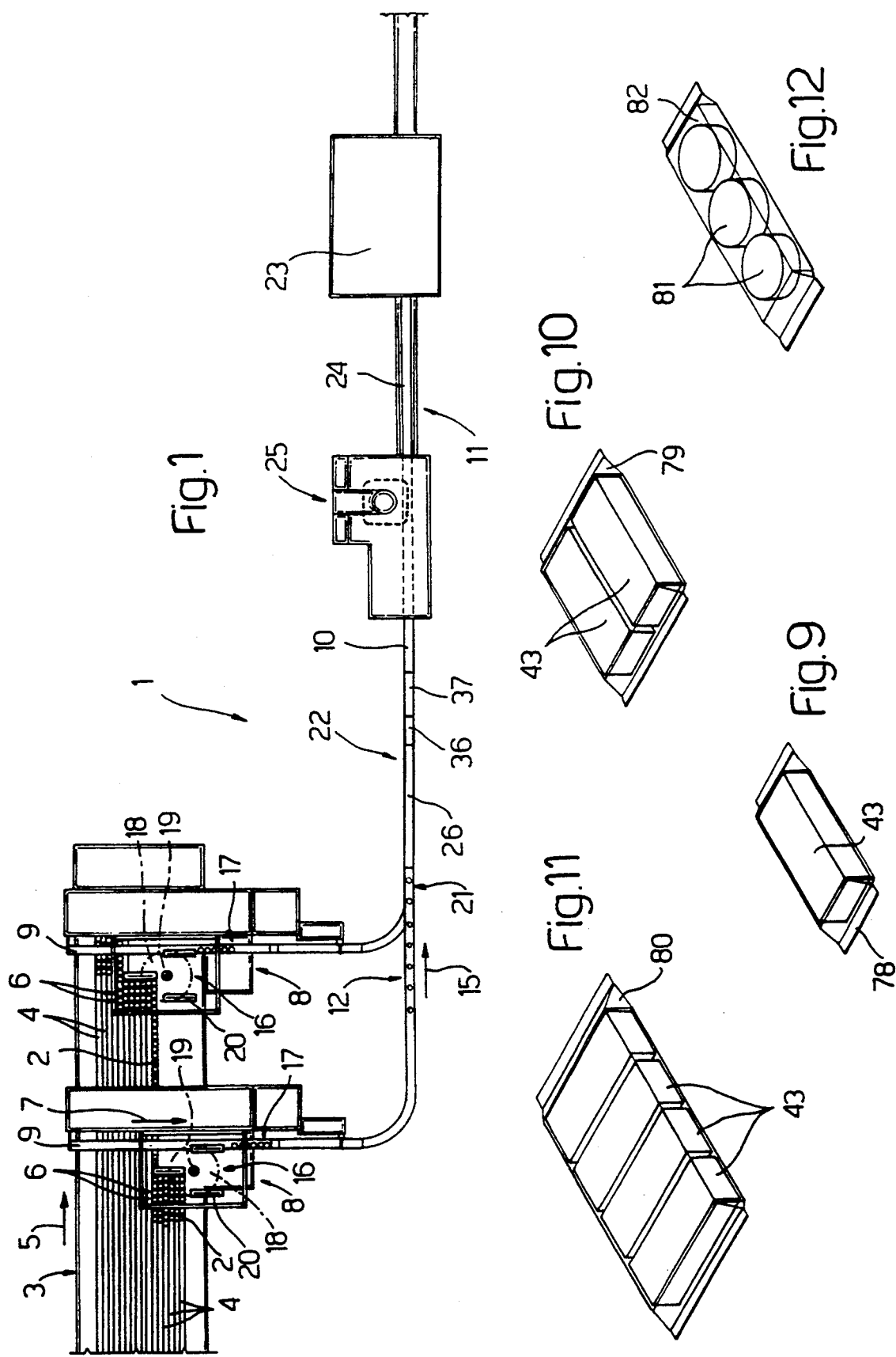
FIG. 1 shows a partial, schematic plan view of a preferred embodiment of the system according to the present invention.

Number 1 in FIG. 1 indicates a system for feeding and packing products 2 in pillow pack type wrappings, products 2 preferably being flat, such as biscuits or similar, or substantially in the form of a rectangular parallelepipedon, such as snacks or similar.

System 1 comprises an input conveyor 3 normally consisting of the output conveyor of the machine (not shown) on which products 2 are produced.

Conveyor 3 is a belt type conveyor on which products 2 are arranged in a number of rows 4 equally spaced over the width, and parallel to the travelling direction 5, of conveyor 3.

Each product 2 in each row 4 is aligned laterally with a corresponding product 2 in each of the other rows 4, so as to form, with said products 2, a line 6 extending across conveyor 3 and in direction 7 perpendicular to travelling direction 5.

System 1 also comprises a number of aligning devices 8 arranged in succession along conveyor 3, and which provide for picking off conveyor 3 the products 2 in a given number of respective rows 4.

For a detailed description of devices 8, refer to Italian Patent Application N. BO91A 000384, to which full reference is made herein in the interest of full disclosure.

Figure 2:
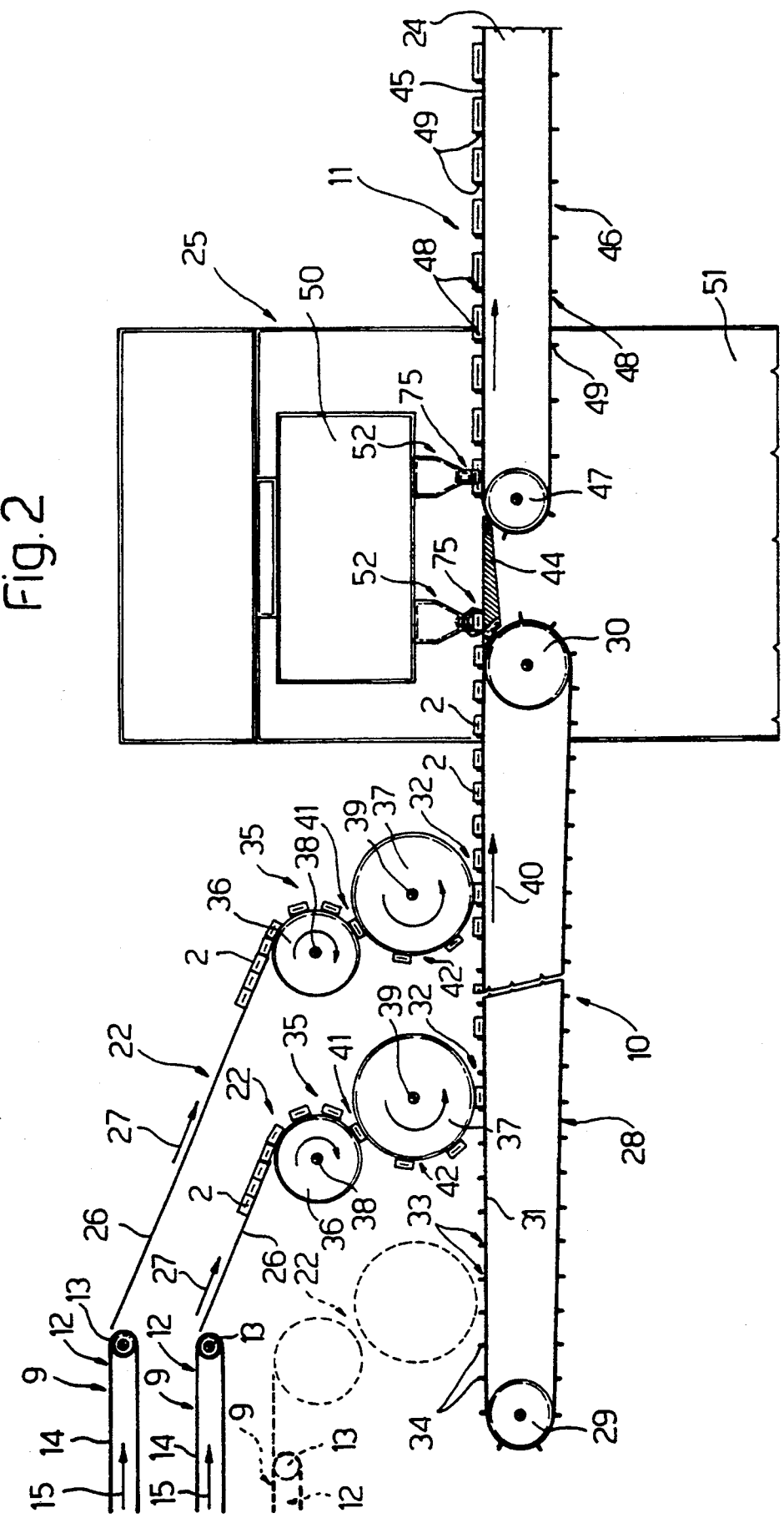
FIG. 2 shows a larger-scale view of a detail in FIG. 1.

Each device 8 comprises a conveyor 9, which provides for feeding the input conveyor 10 of a wrapping line 11, and comprises an input portion extending in direction 7, over conveyor 3, and in a substantially horizontal plane parallel to that of conveyor 3. Conveyor 9 also comprises an output portion defined, as shown in FIG. 2, by a belt 12 looped about two pulleys 13 (only one of which is shown, and at least one of which is powered) and comprising a transportation branch 14 travelling in direction 15 parallel to direction 5.

Each device 8 also comprises at least one pickup device 16 for successively picking up groups 17 of products 2 at a pickup station along the path along which products 2 are fed by conveyor 3, and for transferring groups 17 on to conveyor 9 at an unloading station along the path along which products 2 are fed by conveyor 9.

Device 16 comprises a powered carrousel conveyor 18 rotating clockwise (in FIG. 1) about its axis 19.

Conveyor 18 is a known type of carrousel conveyor supporting, by means of respective vertical rods (not shown), a number of suction heads 20. Each head 20 is fitted to conveyor 18 so as to move axially as determined by a known cam device (not shown) inside conveyor 18, and to rotate about its axis (not shown) parallel to axis 19, in the opposite direction to and at the same angular speed as conveyor 18. When conveyor 18 is rotated, heads 20 thus move, parallel to themselves and in particular to direction 7, along a circular path extending about axis 19 and partly over conveyor 3 at the pickup station and conveyor 9 at the unloading station.

Conveyors 18 and 3 are so synchronized in relation to each other that each head 20, as it travels along said circular path at a speed normally greater than the travelling speed of products 2 along conveyor 3, overlaps a portion of a respective line 6 at the pickup station, picks up by suction the products 2 in said portion of line 6 and constituting a group 17, and feeds them, aligned in direction 7, on to the input portion of conveyor 9.

In this way, a group of rows 4 are combined into one row 21 for supply to wrapping line 11, while the other rows 4 proceed along conveyor 3 and past device 8 to be combined by one or more devices 8 (only one shown in FIG. 1) along conveyor 3 and downstream from the pickup station.

As products 2 in row 21 may not be equally spaced, system 1 comprises, downstream from each conveyor 9, a spacing device 22 (FIG. 2) for forming a series of equally spaced products 2 for supply to input conveyor 10 of wrapping line 11.

As shown in FIG. 1, in addition to conveyor 10, wrapping line 11 also comprises a known wrapping machine 23 for wrapping products 2, singly or in groups, in respective pillow pack type wrappings, and which presents a known input conveyor 24 aligned with conveyor 10 and connected to the same by a product transfer unit 25.

As shown in FIG. 2, each device 22, a detailed description of which is to be found in Italian Patent Application N. BO91A 000391 to which full reference is made herein in the interest of full disclosure, comprises an input conveyor consisting of a supporting surface 26, normally a vibrating surface, connected to the output of respective belt 12 and along which products 2 are fed contacting one another and in a given direction 27. Devices 22 also present a common output conveyor consisting of conveyor 10, which comprises a belt 28 looped about two pulleys 29 and 30, one of which is powered for operating belt 28 at a given substantially constant speed. Belt 28 comprises a substantially horizontal top branch 31 extending through a number of loading stations 32, one for each surface 26, and at each of which products 2 are loaded successively into pockets 33 on conveyor 10. Each pocket 33 is designed to receive a respective product 2 or group of superimposed products 2, and is defined by end projections 34 integral with belt 28.

Each device 22 also comprises a conveyor unit 35 for picking products 2 off respective supporting surface 26 and transferring them to respective loading station 32.

Each unit 35 comprises a first and second conveyor roller 36 and 37 rotated in opposite directions by respective shafts 38 and 39 and about respective axes perpendicular to the FIG. 2 plane and to the travelling direction 40 of branch 31 of conveyor 10. Rollers 36 and 37 are substantially tangent to each other at transfer station 41, and are arranged in series between respective supporting surface 26 and respective loading station 32, at which roller 37, rotating anticlockwise in FIG. 2, is substantially tangent to top branch 31 of belt 28.

Roller 36 is a timing roller rotated clockwise in FIG. 2 by respective shaft 38, and which provides for removing off respective surface 26, by suction and in equally spaced, manner, the products 2 or groups of products 2 substantially contacting one another. Roller 37 is an accelerating output roller rotated anticlockwise in FIG. 2 by respective shaft 39, and which provides for removing products 2 by suction off the periphery of roller 36 at station 41, and for so spacing products 2 as to ensure that, between each pair of adjacent products 2 (or groups of products 2), a gap 42 is left for enabling the passage of projection 34 between products 2 at loading station 32.

Each spacing device 22 thus provides for feeding equally spaced single products 2 or groups of products 2 into respective pockets 33 on conveyor 10. If the speeds of conveyor 10 and rollers 37 are such that each roller 37 feeds a single product 2 or group of products 2 into each pocket 33, each pocket 33, in use, supplies transfer unit 25 with a number of superimposed or side by side products 2, or a number of superimposed or side by side groups of products 2, equal to the number of devices 22 employed.

Figure 3:
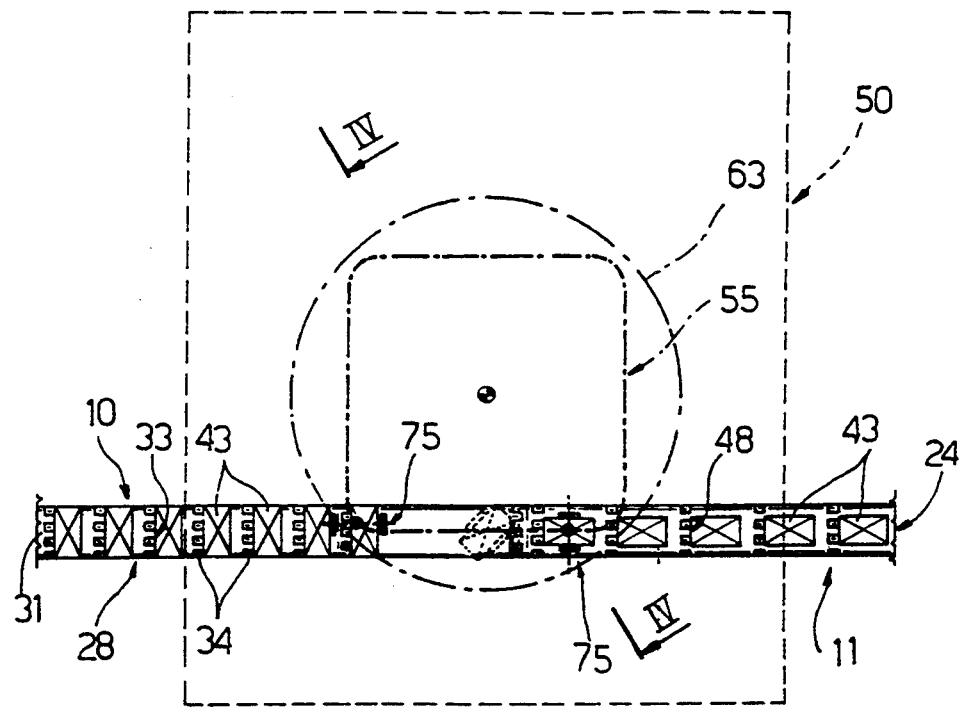
FIG. 3 shows a schematic plan view of a detail in FIG. 2 in a given operating position.

In the following description, it is assumed for the sake of simplicity, and as shown in FIG. 3, that each pocket 33 supplies transfer unit 25 with a succession of single products 2, each consisting of a snack 43 in the form of a rectangular parallelepipedon housed inside pocket 33 with its longer axis perpendicular to direction 40.

As shown in FIG. 2, transfer unit 25 is located over a connecting plate 44 between branch 31 of belt 28 and the top branch 45 of belt 46 of conveyor 24, which, like conveyor 10, is an endless conveyor looped about pulleys 47 (only one shown) and presenting transportation pockets 48, each defined by respective projections 49.

Figure 5:
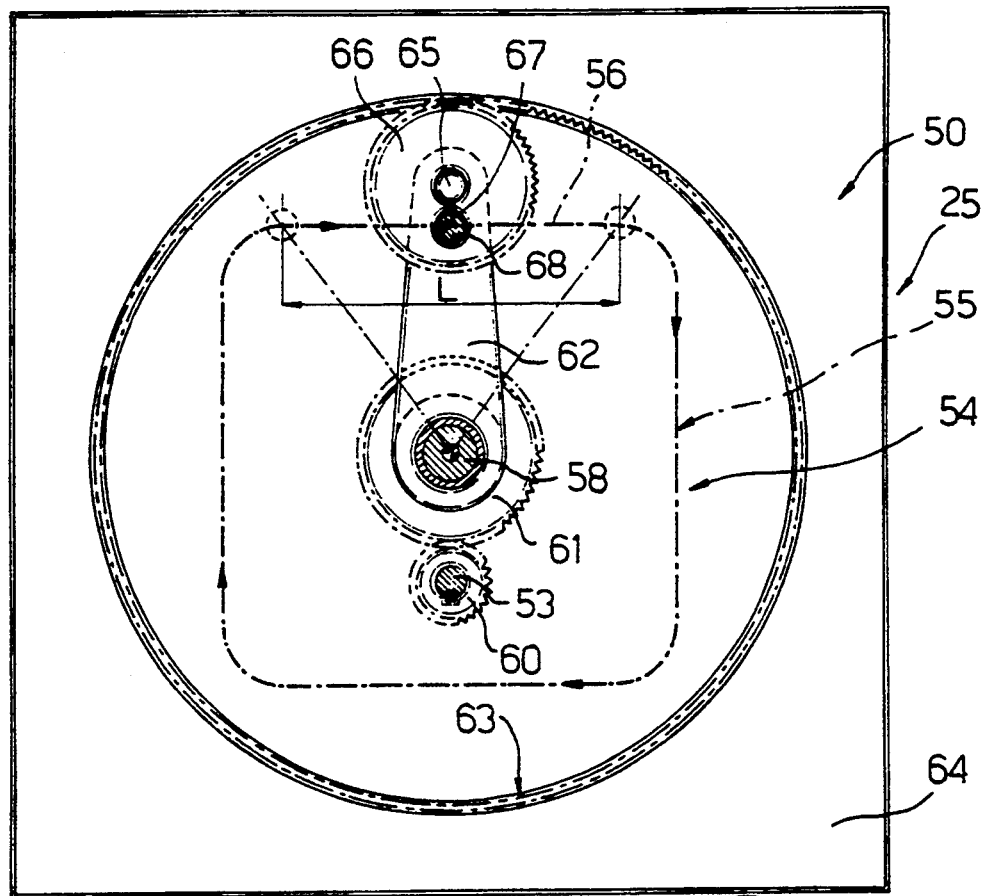
FIG. 5 shows a section along line V—V in FIG. 4.
Figure 4:
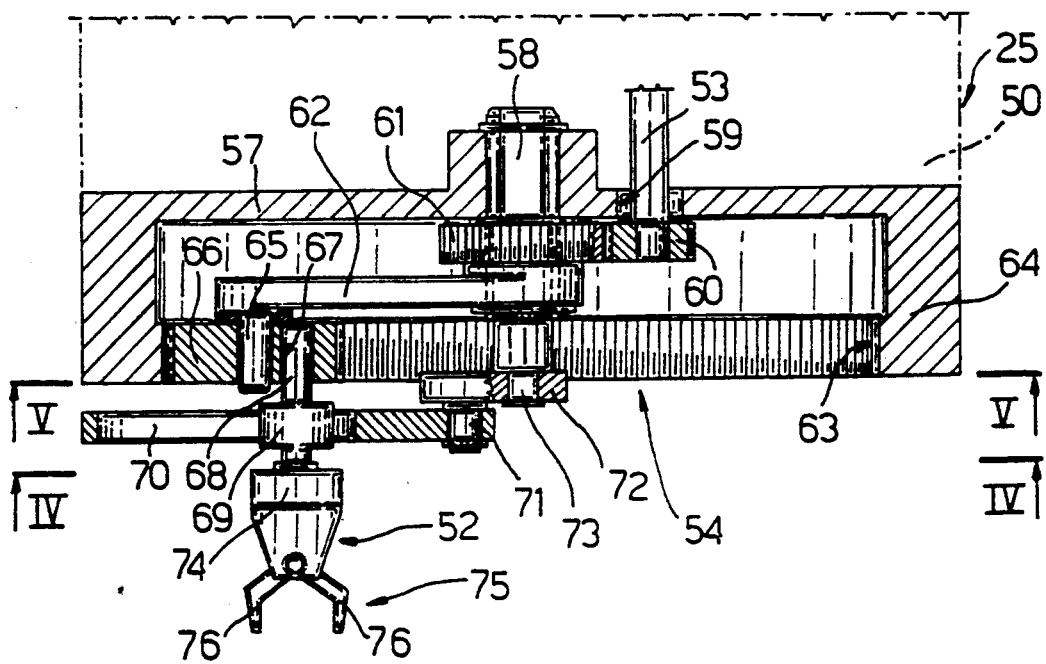
FIG. 4 shows a section along line IV—IV in FIG. 3.
Figure 6:
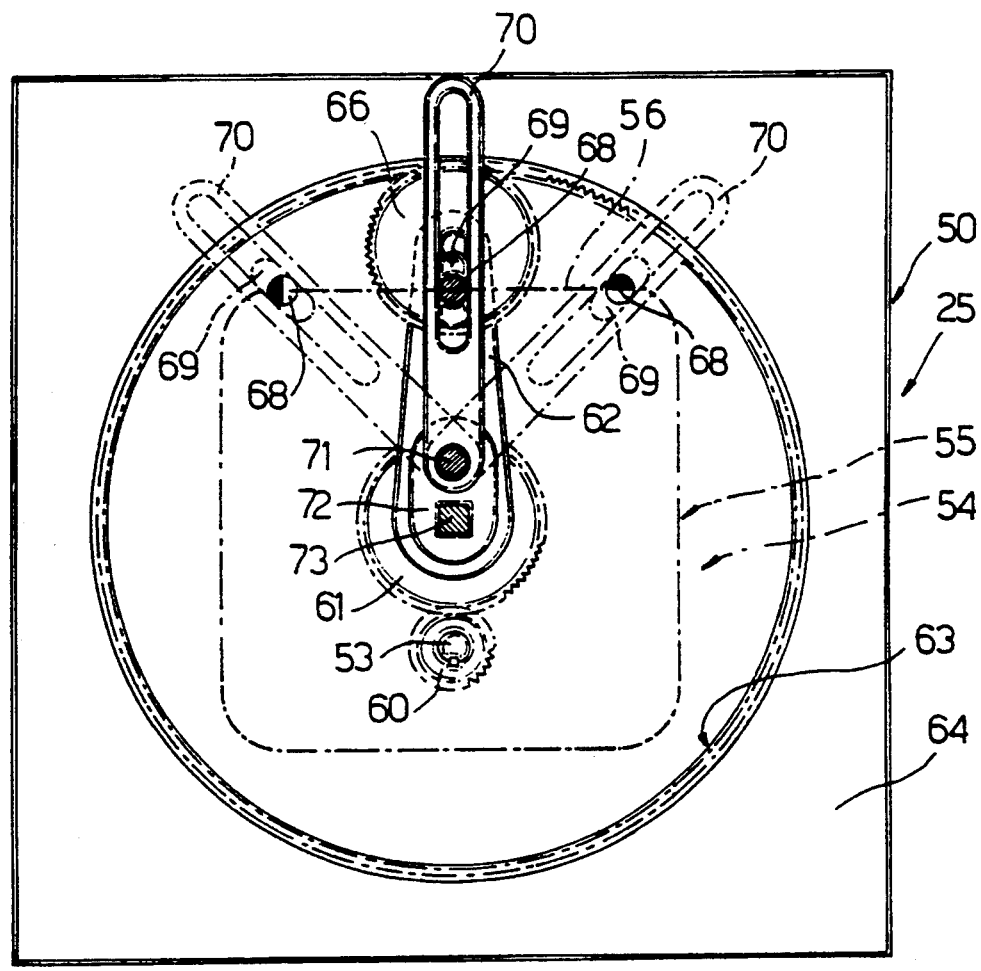
FIG. 6 shows a section along line VI—VI in FIG. 4.

With reference to FIGS. 4 to 7, and particularly FIGS. 4 and 5, transfer unit 25 comprises a casing 50 in the form of a rectangular parallelepipedon supported on an upright 51 (FIG. 2) over plate 44; and at least one transportation head 52 operated by a drive shaft 53 by which it is moved, via the interposition of a hypocyclic drive 54, along a substantially quadrilateral path 55, one straight portion or side 56 of which is aligned with conveyors 10 and 24, and presents a length L greater than that of plate 44 and such as to overlap the facing end portions of conveyors 10 and 24.

As shown in FIGS. 4 and 5, casing 50 presents a transverse wall 57 fitted through with a vertical, axially- and angularly-fixed shaft 58 parallel to drive shaft 53. Shaft 53 engages in rotary manner a hole 59 formed through wall 57, and is fitted on the end inside casing 50 with a pinion 60 meshing with a sun gear 61 mounted for rotation on shaft 58.

In addition to sun gear 61, drive 54 also comprises a carrier arm 62 mounted for rotation on shaft 58, integral with sun gear 61, and extending radially from shaft 58 towards a fixed ring gear 63 formed on the inner surface of lateral wall 64 of casing 50. Close to its free end, arm 62 is fitted with a pin 65 parallel to shaft 58 and supporting for rotation a planetary gear 66 meshing with ring gear 63.

Planetary gear 66 presents an eccentric axial through hole 67, the location of which is so calculated, according to known mathematical laws governing hypocyclic drives, that, as planetary gear 66 rolls along ring gear 63, the axis of hole 67 moves cyclically along path 55, and in particular along side 56.

Hole 67 is engaged in rotary manner by a shaft 68 parallel to shaft 58 and projecting downwards from the bottom end of casing 50. The intermediate portion of shaft 68 is fitted integral with a transverse olive 69, which constitutes the slide of a link 70 mounted for rotation on a pin 71 parallel to shaft 58 and fitted eccentrically to a radial arm 72 extending perpendicular to side 56 and fitted to end portion 73 of shaft 58. The position of pin 71 on arm 72 is such that the lines joining the axis of pin 71 and the ends of side 56 form an angle of 90°.

The bottom end of shaft 68 is fitted integral with the casing of a step motor 74, the output shaft (not shown) of which is coaxial with shaft 68 and fitted with transportation head 52. When motor 74 is idle, head 52 is rotated by link 70 through an angle of 90° (FIG. 7) about its axis and in relation to casing 50, as it travels along side 56 of path 55. Conversely, when motor 74 is operated, head 52 may rotate in any manner whatsoever as it travels along side 56. In particular (FIG. 8), motor 74 may be so operated as to rotate head 52 backwards by 90° as it travels along side 56, so that, along side 56, head 52 moves parallel to itself.

Figure 8:
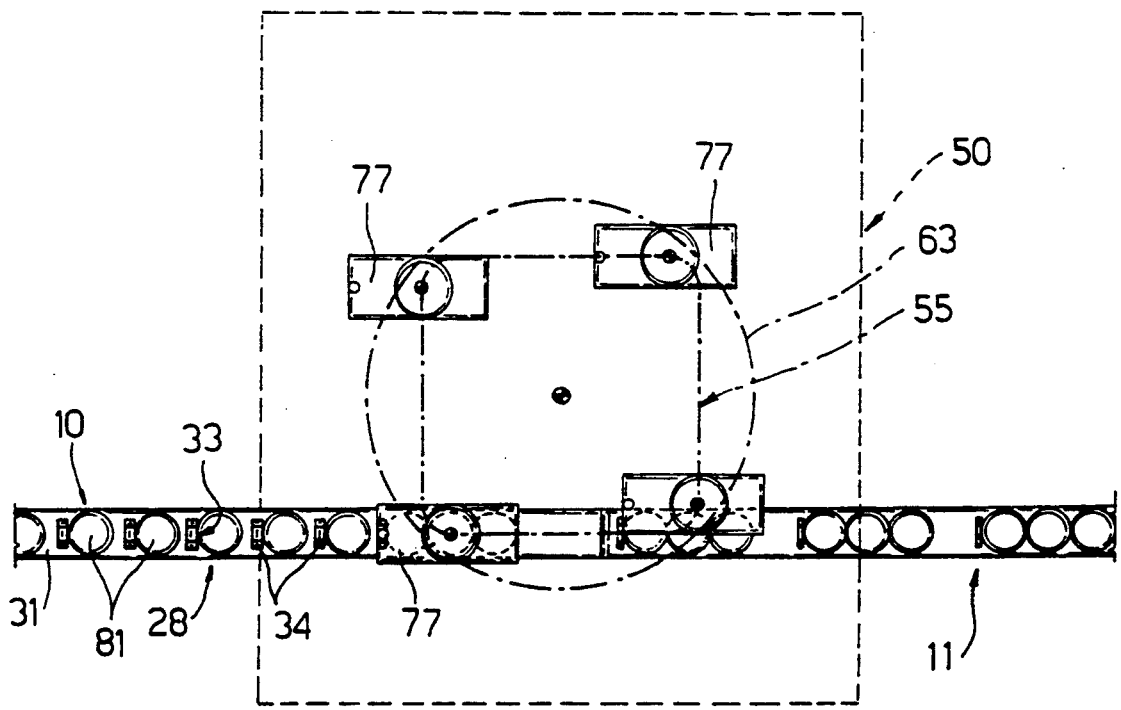
FIG. 8 is similar to FIG. 3, and shows a plan view of an alternative embodiment of a detail in FIG. 2 in a given operating position.
Figure 7:
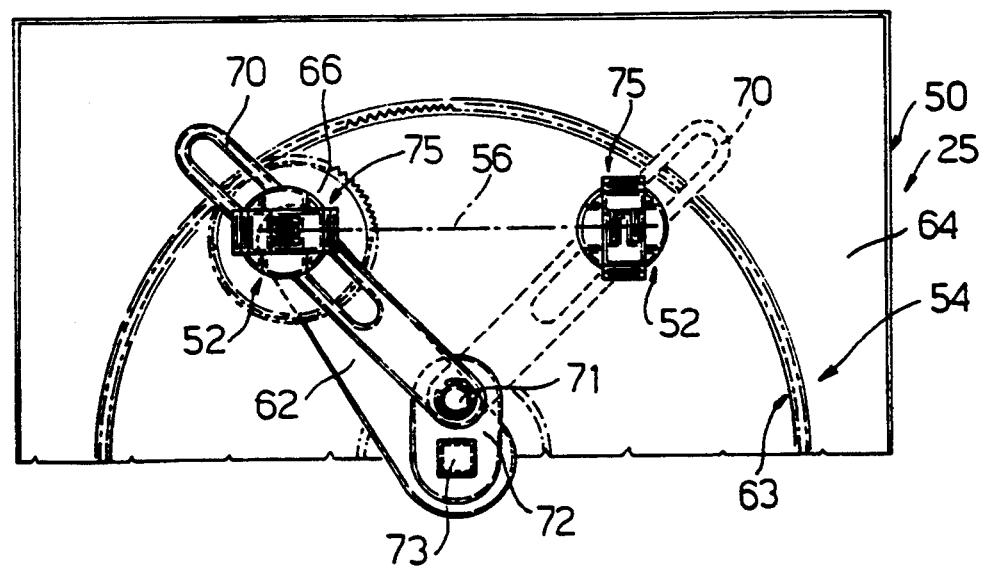
FIG. 7 shows a bottom view of the detail in FIGS. 5 and 6.

According to the embodiment shown in FIGS. 3, 4 and 7, head 52 comprises a known grip 75 defined by two opposed powered arms 76. Alternatively, as shown in FIG. 8, head 52 comprises a known suction plate 77 for simultaneously engaging a number of products 2, in particular a number of snacks 43.

Though the foregoing description relates to a single head 52, drive 54 may of course comprise a number of planetary gears 66 and, hence, a number of heads 52, e.g. four, equally spaced about shaft 58.

In actual use, in the event (FIG. 2) each pocket 33 on conveyor 10 supplies plate 44 with a respective snack 43 arranged crosswise in relation to direction 40, each snack 43 is gripped by a respective grip 75 prior to reaching the output end of conveyor 10, and motor 74 is left idle so as to enable grip 75 to feed snack 43, rotated 90°, on to conveyor 24. Snack 43 may thus be wrapped by machine 23 in a pillow pack wrapping 78 as shown in FIG. 9 and arranged parallel to the longer axis of snack 43.

If, on the other hand, grip 75 is replaced by a suction plate 77 capable of simultaneously engaging two snacks 43 on conveyor 10, and motor 74 is left idle, conveyor 24 may be supplied with successive pairs of snacks 43 arranged side by side and rotated 90°. Each pair of snacks 43 may thus be wrapped by machine 23 in a pillow pack wrapping 79 as shown in FIG. 10 and arranged parallel to the longer axis of snacks 43.

If, on the other hand, a suction plate 77 is employed capable of simultaneously engaging, say, four snacks 43 on conveyor 10, and motor 74 is operated so as to rotate plate 77 backwards by 90° as described previously, conveyor 24 may be supplied successively with groups of four snacks 43 arranged side by side and crosswise in relation to the travelling direction of conveyor 24. Each group of four snacks 43 may thus be wrapped by machine 23 in a pillow pack wrapping 80 as shown in FIG. 11 and arranged with its axis crosswise in relation to the longer axis of snacks 43.

Finally, in the event products 2 consist, for example, of biscuits 81 (FIG. 12), a number of biscuits 81 may be aligned (in one or more layers) inside each pocket 33 on conveyor 10, preferably inside a cup-shaped container (not shown) fed beforehand in known manner into each pocket 33. Once filled as it travels along conveyor 10, each container (not shown) is transferred by a grip 75 from conveyor 10 to conveyor 24. In this case, motor 74 is operated so as to maintain the containers (not shown) parallel to themselves during transfer, and enable them to be wrapped in respective wrappings 82 as shown in FIG. 12 and arranged with their axis parallel to the axis of the containers (not shown).

I claim:

1. A system for feeding and packing products in pillow pack wrappings, the system comprising a machine for wrapping the products in pillow pack type wrappings; an input conveyor to said machine; a feed conveyor for feeding an orderly succession of said products to the input conveyor; and transfer means for transferring the products from the feed conveyor to the input conveyor, with the two conveyors having facing end portions; said transfer means comprising at least one transportation head, and drive means for moving the transportation head along a substantially quadrilateral path, one side of which extends along the facing end portions of the two conveyors, and wherein said drive means comprise a hypocyclic drive.

2. A system as claimed in claim 1, further comprising, upstream from said feed conveyor, at least one aligning device for arranging into one row a number of said products originally arranged in a number of parallel rows; and a spacing device for arranging the products in said one row into a given order.

3. A system as claimed in claim 1, wherein the transportation head is located over said two conveyors.

4. A system as claimed in claim 1, wherein the two conveyors are aligned with each other.

5. A system as claimed in claim 1, wherein said transfer means comprise actuating means selectively operable for rotating said transportation head by a given amount about its axis and in relation to said drive.

6. A system as claimed in claim 1, wherein said transportation head is selectable from a group comprising transportation heads with a gripping member comprising a grip having at least one gripping arm, and transportation heads with a gripping member comprising a suction member.

7. A system as claimed in claim 1, wherein said hypocyclic drive comprises a drive sun gear; a train carrier rotating with and about the axis of the sun gear; a fixed ring gear surrounding the sun gear; a planetary gear meshing with the ring gear and supported in a rotary manner on the train carrier; and an eccentric shaft fitted to said planetary gear; said transportation head being connected to said eccentric shaft (68) so as to move, in use, with the eccentric shaft along said path.

8. A system as claimed in claim 7, wherein said transfer means comprise actuating means selectively operable for rotating said transportation head by a given amount about an axis and in relation to said hypocyclic drive, and wherein said actuating means are interposed between said transportation head and said eccentric shaft.

9. A system as claimed in claim 7, wherein said hypocyclic drive further comprises means for controlling the amount of rotation of said transportation head about its axis subsequent to displacement of said eccentric shaft along said side of said path.

10. A system for feeding and packing products in wrappings comprising:
a machine for wrapping products;
an input conveyor conveying products to said machine;
a feed conveyor feeding a succession of products to said input conveyors, wherein the two conveyors have facing end portions;
a transfer device including at least one transportation head, and a hypocyclic drive which moves the transportation head along a substantially quadrilateral path in order to transfer products from the feed conveyor to the input conveyor.

* * * * *